United States Patent
Shimizu et al.

[11] Patent Number: 5,900,898
[45] Date of Patent: May 4, 1999

[54] LIQUID JET HEAD HAVING A CONTOURED AND SECURED FILTER, LIQUID JET APPARATUS USING SAME, AND METHOD OF IMMOVABLY SECURING A FILTER TO A LIQUID RECEIVING MEMBER OF A LIQUID JET HEAD

[75] Inventors: Eiichiro Shimizu, Urawa; Tsutomu Abe, Isehara, both of Japan

[73] Assignee: Canon Kabushiki Kaisha, Tokyo, Japan

[21] Appl. No.: 08/747,748

[22] Filed: Nov. 12, 1996

Related U.S. Application Data

[63] Continuation of application No. 08/172,380, Dec. 23, 1993, abandoned.

[30]      Foreign Application Priority Data

Dec. 25, 1992   [JP]   Japan ................................. 4-345672

[51] Int. Cl.⁶ ................................................. B41J 2/175
[52] U.S. Cl. ........................................ 347/93; 210/497.01
[58] Field of Search .................. 347/93, 86; 210/497.01, 210/497.3

[56]              References Cited

U.S. PATENT DOCUMENTS

| | | | |
|---|---|---|---|
| 3,708,118 | 1/1973 | Keur ..................................... | 347/93 X |
| 3,779,390 | 12/1973 | Oberthur . | |

(List continued on next page.)

FOREIGN PATENT DOCUMENTS

| | | | |
|---|---|---|---|
| 0240710 | 10/1987 | European Pat. Off. .......... | H01R 9/09 |
| 0261764 | 3/1988 | European Pat. Off. ......... | B41J 27/18 |
| 0313205 | 4/1989 | European Pat. Off. ......... | B41J 25/30 |
| 0320165 | 6/1989 | European Pat. Off. ........... | B41J 3/04 |
| 0373302 | 6/1990 | European Pat. Off. ........... | B41J 2/17 |
| 0378240 | 7/1990 | European Pat. Off. ......... | B41J 2/175 |
| 0380199 | 8/1990 | European Pat. Off. ......... | B41J 25/24 |
| 444654 | 9/1991 | European Pat. Off. ......... | B41J 2/165 |
| 0486309 | 5/1992 | European Pat. Off. ........... | B41J 2/17 |
| 0488829 | 6/1992 | European Pat. Off. ......... | B41J 2/175 |
| 0490579 | 6/1992 | European Pat. Off. ......... | B41J 2/175 |
| 0493058 | 7/1992 | European Pat. Off. ........... | B41J 2/17 |
| 0529625 | 3/1993 | European Pat. Off. ......... | B41J 2/175 |
| 0574888 | 12/1993 | European Pat. Off. ......... | B41J 2/175 |
| 2136531 | 12/1972 | France ............................... | B41J 3/00 |
| 3511381 | 10/1985 | Germany .......................... | B41J 3/04 |
| 54-56847 | 5/1979 | Japan .............................. | B41M 5/26 |
| 55-3961 | 1/1980 | Japan .............................. | B41J 3/04 |
| 57-116680 | 1/1981 | Japan .............................. | B41J 27/00 |
| 56-67269 | 6/1981 | Japan .............................. | B41J 3/04 |
| 57-16385 | 1/1982 | Japan .............................. | B43K 8/02 |
| 58-181656 | 10/1983 | Japan .............................. | B41J 3/04 |
| 59-33154 | 2/1984 | Japan .............................. | B41J 3/04 |
| 59-98857 | 6/1984 | Japan .............................. | B41J 3/04 |
| 59-123670 | 7/1984 | Japan .............................. | B41J 3/04 |
| 59-138461 | 8/1984 | Japan .............................. | B41J 3/04 |
| 60-71260 | 4/1985 | Japan .............................. | B41J 3/04 |
| 60-85962 | 5/1985 | Japan .............................. | B41J 3/04 |
| 60-232965 | 11/1985 | Japan .............................. | B41J 3/04 |
| 60-234848 | 11/1985 | Japan .............................. | B41J 3/04 |

(List continued on next page.)

*Primary Examiner*—Joseph W. Hartary
*Attorney, Agent, or Firm*—Fitzpatrick, Cella, Harper & Scinto

[57]              ABSTRACT

A liquid jet head can be detachably fitted into an opening portion of a liquid tank having a liquid absorbing member therein by a liquid receiving member with a liquid path formed therein. The liquid head has a filter, and the peripheral part of the filter is immovably embedded in the foremost end of the liquid receiving member such that the radially outermost end of the filter is not exposed, and the filter is maintained so as to have a dome-shaped contour adapted to come in pressure contact with the liquid absorbing member when the liquid jet head is fitted to the liquid tank by the immovable embedding of the peripheral part of the filter therein. A liquid jet apparatus with a liquid tank has a liquid absorbing member and an opening portion formed thereon, as well as a liquid jet head of this type. A method of immovably securing a filter to a liquid receiving member of a liquid jet head is also described.

21 Claims, 5 Drawing Sheets

FOREIGN PATENT DOCUMENTS

| | | | |
|---|---|---|---|
| 360262653 | 12/1985 | Japan | B41J 3/04 |
| 61-35958 | 2/1986 | Japan | B41J 3/04 |
| 62-152757 | 7/1987 | Japan | B41J 3/04 |
| 62-208947 | 9/1987 | Japan | B41J 3/04 |
| 63-37954 | 2/1988 | Japan | B41J 3/04 |
| 63-87242 | 4/1988 | Japan | B41J 3/04 |
| 63-154355 | 6/1988 | Japan | B41J 3/04 |
| 1-133747 | 5/1989 | Japan | B41J 3/04 |
| 2-522 | 1/1990 | Japan | B41J 3/04 |
| 2-121841 | 5/1990 | Japan | B41J 3/04 |
| 2-204044 | 8/1990 | Japan | B41J 3/04 |
| 2-214666 | 8/1990 | Japan | B41J 3/04 |
| 2-39213 | 10/1990 | Japan | G01D 15/16 |
| 3-55253 | 3/1991 | Japan | B41J 2/01 |
| 3-169557 | 7/1991 | Japan | B41J 2/045 |
| 3-293155 | 12/1991 | Japan | B41J 2/175 |
| 4-206752 | 7/1992 | Japan | H01L 21/66 |
| 5-16339 | 1/1993 | Japan | B41J 2/01 |
| 762906 | 12/1956 | United Kingdom . | |

U.S. PATENT DOCUMENTS

| | | | |
|---|---|---|---|
| 4,014,797 | 3/1977 | Raines | 210/497.01 X |
| 4,313,124 | 1/1982 | Hara . | |
| 4,345,262 | 8/1982 | Shirato et al. . | |
| 4,459,600 | 7/1984 | Sato et al. . | |
| 4,463,359 | 7/1984 | Ayata et al. . | |
| 4,509,062 | 4/1985 | Low et al. . | |
| 4,509,063 | 4/1985 | Sugitani et al. . | |
| 4,558,333 | 12/1985 | Sugitani et al. . | |
| 4,571,599 | 2/1986 | Rezanka . | |
| 4,608,577 | 8/1986 | Hori . | |
| 4,635,078 | 1/1987 | Sakurada et al. . | |
| 4,635,080 | 1/1987 | Watanabe . | |
| 4,698,645 | 10/1987 | Inamoto . | |
| 4,723,129 | 2/1988 | Endo et al. . | |
| 4,740,796 | 4/1988 | Endo et al. . | |
| 4,771,295 | 9/1988 | Baker et al. . | |
| 4,774,529 | 9/1988 | Paranjpe et al. . | |
| 4,794,409 | 12/1988 | Cowger et al. . | |
| 4,907,018 | 3/1990 | Pinkerpell et al. . | |
| 4,920,362 | 4/1990 | Cowger . | |
| 4,967,207 | 10/1990 | Ruder . | |
| 4,994,824 | 2/1991 | Winslow . | |
| 4,994,828 | 2/1991 | Smart . | |
| 5,017,947 | 5/1991 | Masuda . | |
| 5,021,809 | 6/1991 | Abe et al. | 347/94 |
| 5,025,271 | 6/1991 | Baker et al. . | |
| 5,030,973 | 7/1991 | Nomoyama | 347/93 |
| 5,051,759 | 9/1991 | Karita et al. . | |
| 5,095,321 | 3/1992 | Saito et al. . | |
| 5,103,243 | 4/1992 | Cowger . | |
| 5,155,502 | 10/1992 | Kimura | 347/86 |
| 5,162,817 | 11/1992 | Tajika et al. . | |
| 5,182,581 | 1/1993 | Kashimura et al. . | |
| 5,221,334 | 6/1993 | Ma et al. . | |
| 5,237,342 | 8/1993 | Saikawa | 347/87 |
| 5,262,808 | 11/1993 | Karita et al. . | |
| 5,565,899 | 10/1996 | Sugimoto | 347/93 X |

LIQUID JET HEAD HAVING A CONTOURED AND SECURED FILTER, LIQUID JET APPARATUS USING SAME, AND METHOD OF IMMOVABLY SECURING A FILTER TO A LIQUID RECEIVING MEMBER OF A LIQUID JET HEAD

This application is a continuation of application No. 8/172,380, filed Dec. 23, 1993, now abandoned.

BACKGROUND OF THE INVENTION

FIELD OF THE INVENTION

The present invention relates generally to a liquid jet head and a liquid jet apparatus having the foregoing liquid jet head used therefore. More particularly, the present invention relates to a liquid jet head and a liquid jet apparatus of the foregoing types each serving to eject or discharge liquid droplets therefrom toward a recording medium such as a recording sheet, a cloth or the like so as to perform a recording operation or a printing operation with the ejected liquid droplets.

DESCRIPTION OF THE RELATED ART

Conventionally, a recording apparatus exhibiting the function of a printer, a duplicating machine, a facsimile and the like or a recording apparatus operable as an output device for a complex type electronic device including a computer, a word processor or the like or a work station is constructed such that images are sequentially recorded on a recording medium such as a recording sheet, a plastic film or the like in conformity with the recording information. The recording apparatus of the foregoing type is classified into several ones, i.e., an ink jet type recording apparatus, a wire dot type recording apparatus, a thermal type recording apparatus and a laser beam type recording apparatus depending on the recording system employed therefore.

With respect to a serial type recording apparatus having a serial scanning system employed therefore with main scanning effected in a direction perpendicular to a direction of conveyance of a recording medium (i.e., auxiliary scanning direction), a recording operation is achieved for the whole area of a recording sheet in such a manner that after the recording sheet is set at a predetermined recording position, images are sequentially recorded on the recording sheet in the main scanning direction by a recording head mounted on a carriage adapted to be slidably displaced along the recording sheet, subsequently, after completion of the recording operation by a distance corresponding to a single line, the recording sheet is conveyed by a predetermined distance in the auxiliary scanning direction, subsequently, on completion of the conveyance, the recording sheet is kept immovable so that images are sequentially recorded on the recording sheet in the main scanning direction again by a distance corresponding to a next line, and thereafter, the foregoing steps are repeated until images corresponding to all lines are recorded on the recording sheet. On the other hand, in a line type recording apparatus which performs a recording operation by auxiliary scanning effected in a direction of conveyance of a recording sheet, each recording operation is achieved for the whole area of the recording sheet in such a manner that the recording sheet is set at a predetermined recording position, subsequently, it is continuously conveyed in the auxiliary scanning direction while recording all images corresponding to a single line on the recording sheet, and the preceding is continued until images corresponding to all lines are recorded on the recording sheet.

Among the aforementioned recording apparatuses, an ink jet type recording apparatus (that is called an ink jet recording apparatus) performs a recording operation by ejecting or discharging ink droplets toward a recording medium from a recording head and has many advantages that recording means can easily be made compact, images can be recorded not only at a high speed but also at a high accuracy, images can be recorded on a plain sheet without any necessity for special preliminary treatment, the recording apparatus can be operated at an inexpensive running cost, few noisy sound is generated from the recording apparatus because of a non-impact system employed for the latter, and moreover, colored images can easily be recorded on the recording sheet using plural kinds of inks each having a different color. In the case of a line type recording apparatus including a line type recording head having a number of discharging orifices arranged in the direction of a width of the recording sheet, each recording operation can be achieved at a higher speed.

Especially, an ink jet type recording head adapted to eject ink by utilizing thermal energy includes on a base substrate electrothermal converting elements, electrodes, liquid path walls and ceiling plates each formed by employing a film forming technique associated with a semiconductor producing process by way of steps of etching, vacuum depositing, spattering and so forth. Thus, a recording head of the foregoing type including liquid paths and discharging orifices at a high density can easily be produced. In other words, the recording head can be made more compact. On the other hand, various requests have been raised from users with respect to a material to be employed for a recording medium such as a recording sheet or the like. In recent years, in addition to a sheet of paper, a synthetic resin sheet (for an OHP or the like), it has been required that a thin sheet of paper, a processed sheet of paper (e.g., a paper sheet having a plurality of punched holes formed therethrough for the purpose of filing, a perforated paper sheet, a paper sheet having an arbitrary shape or the like), a cloth or the like can be used as a material employable for the recording medium.

A recording head for an ink jet recording apparatus constructed such that an ink receiving section (hereinafter referred to as an ink tank) for receiving ink to be supplied to the recording head adapted to eject ink droplets therefrom is arranged independently of the recording head and the ink tank is detachably fitted to the recording head is hitherto known as a typical recording head of the foregoing type. With respect to the recording head constructed such that the ink tank is attachable to and detachable from the recording head, a proposal has been already made such that a porous member is filled in the ink tank to store ink to be supplied to the recording head therein, and a filter is disposed on an ink supply port at the foremost end of a cylindrical ink supply member on the recording head side to be fitted into an ink supply port of the ink tank. To clearly distinguish the ink supply port of the ink tank from the ink supply port of the cylindrical ink supply member, the ink supply port of the cylindrical ink supply member is hereinafter referred to as an ink supply opening portion.

When the filter is disposed on the ink supply opening portion on the ink head side in that way, there do not arise malfunctions that fractured pieces of the porous member received in the ink tank, dust or similar foreign material invade in the recording head, and moreover, dust invades in the recording head from outside when the ink tank is disconnected from the recording head.

FIGS. 7 and 8 show by way of example based on the foregoing proposed technical concept structure of a cylindrical ink supply member and an ink supply opening portion at the foremost end thereof. The shown examples are disclosed in U.S. Ser. No. 76,979 filed Jun. 16, 1993, assigned to the assignee of the present application, and the disclosure of the application is incorporated by reference. In these figures, reference numeral 105 designates a cylindrical ink supply member projected from a recording head side toward an ink tank side. In the case shown in FIG. 7, the foremost end 105A of the cylindrical ink supply sleeve 105 is designed to have a semispherical contour so as to allow it to be easily fitted to the ink tank side. Reference numeral 115 designates a filter having a fine mesh size disposed at the foremost end 105A of the ink supply sleeve 105 (hereinafter referred to as a cylindrical member). In the case shown in FIG. 8, a reinforcement skeleton 125 is attached to the rear surface of the filter 115 so as to stably maintain the semispherical contour of the filter 115.

However, according to the prior proposal, a peripheral part 115A of the filter 115 is exposed to outside, and moreover, a part of the filter 115 having a fine mesh size is fixedly secured to the foremost end part 105A of the cylindrical member 105 by employing a thermal fusing process. For this reason, following problems are left still unsolved.

(1) In the case of an ink tank replacing type liquid jet apparatus, when each empty ink tank is replaced with a new one, there is a possibility that the peripheral part 115A of the filter 115 is entangled with a porous member (not shown) filled in the ink tank, causing that it would be difficult to disassemble or assemble the ink tank from or with the ink jet head, or the filter 115 might be dislocated from the foremost end part 105A of the cylindrical member 105.

(2) To assure that a recording operation is performed at a higher accuracy, any dust is not permitted to enter the recording head. For this reason, it is required that the filter 115 has a very fine mesh size. To assure that a high thermal fusing strength of the filter 115 around the peripheral part 115A is maintained after completion of the filter placement, it becomes necessary that a fusing tolerance (area) is increased. However, when a sufficiently large fusing tolerance is assigned around the peripheral part 115A of the filter 115, there arises a malfunction that the molten part of the cylindrical member 105 is expanded inside of the inner wall surface of an ink supply path 105B, resulting in ink supply being obstructed. Otherwise, there arises another malfunction that the molten part of the cylindrical member 105 is expanded outside of the peripheral part 115A of the filter 115, causing other components associated with the cylindrical member 105 to be adversely affected.

SUMMARY OF THE INVENTION

The present invention has been made in consideration of the aforementioned background.

An object of the present invention is to provide a liquid ejecting head which assures that a filter securely cover the foremost end part of an ink supply path without any possibility that it is disconnected from the latter.

Another object of the present invention is to provide a liquid ejecting apparatus having a liquid ejecting head of the foregoing type used therefore.

Further object of the present invention is to provide a method of immovably securing a filter to the foremost end part of an ink receiving member of a liquid ejecting head of the foregoing type.

In the first aspect of the present invention, a liquid jet head adapted to be detachably fitted into an opening portion of a liquid tank having a liquid absorbing member via a liquid receiving member having a liquid path formed therein, the liquid jet head comprises;

a filter, and wherein the peripheral part of the filter is immovably embedded in the foremost end of the liquid receiving member.

Here, the filter may be configured in such a manner as to be projected toward the liquid absorbing member filled in the liquid tank.

The liquid receiving member may be shaped in such a manner as to be cylindrical and the filter may be immovably embedded at the foremost end of the cylindrical liquid receiving member.

The peripheral part of the filter may be dimensioned to have a diameter smaller than an outer diameter of the liquid receiving member.

The peripheral part of the filter may be thermally fused to the foremost end of the liquid receiving member.

The filter may be made of a metallic material.

The filter may have a dome-shaped contour.

The liquid jet head may comprise a common liquid chamber communicated with the liquid path of the liquid receiving member, a plurality of discharging orifices, a plurality of second liquid paths by way of which each of the discharging orifices is communicated with the common liquid chamber, and a plurality of electrothermal converting elements disposed in the second liquid paths so as to generate thermal energy for ejecting liquid from the discharging orifices.

Each of the electrothermal converting elements may serve to produce film boiling of the liquid.

The liquid may be ink.

In the second aspect of the present invention, there is provided a liquid jet apparatus including a liquid tank having a liquid absorbing member and having an opening portion formed thereon, and a liquid jet head adapted to be detachably fitted into the opening portion of the liquid tank via a liquid receiving member having a liquid path formed therein, wherein;

the liquid jet head comprises a filter adapted to come in pressure contact with the liquid absorbing member when the liquid jet head is fitted to the liquid tank, and the peripheral part of the filter is immovably embedded in the foremost end of the liquid receiving member.

The filter may be configured in such a manner as to be projected toward the liquid absorbing member filled in the liquid tank.

The liquid receiving member may be shaped in such a manner as to be cylindrical and the filter may be immovably embedded at the foremost end of the cylindrical liquid supply member.

The liquid jet head may comprise a common liquid chamber communicated with the liquid path of the liquid receiving member, a plurality of discharging orifices, a plurality of second liquid paths by way of which each of the discharging orifices is communicated with the common liquid chamber, and a plurality of electrothermal converting elements disposed in the second liquid paths so as to generate thermal energy for ejecting liquid from the discharging orifices.

Each of the electrothermal converting elements may serve to produce film boiling of the liquid.

In the third aspect of the present invention, a method of immovably securing a filter to a liquid receiving member of a liquid jet head adapted to be detachably fitted into an opening portion of a liquid tank via the liquid receiving member having a liquid path formed therein, the liquid tank being filled with a liquid absorbing member, comprises;

a step of providing the liquid receiving member, the liquid receiving member being formed an annular flat shelf part and an annular projected part located outside of the flat annular shelf part at the foremost end thereof, a step of placing a flat filter at least inside of the annular projected part, and a step of heating and pressing the annular projected part of the liquid receiving member with the aid of a die having a recess, in which an inclined surface is formed at least at a position where the recess comes into contact with the annular projected part, and dimensioned to have a diameter larger than that of the annular projected part of the liquid receiving member, whereby the filter being deformed to be projected toward the recess and the peripheral part of the filter being secured to the foremost end of the liquid receiving member by fusing.

The annular projected part may be tapered from the annular flat shelf part toward the peripheral edge of the liquid receiving member.

The filter may be placed on the annular flat shelf part.

The outer peripheral surface of the annular projected part may be inwardly inclined while tapering toward the foremost end thereof.

A method may further comprise a step of forming an annular supporting part above the flat annular shelf part at the foremost end of the cylindrical member so as to allow the filter to be placed on the annular supporting part.

According to the present invention, since the filter is immovably secured to the foremost end of the cylindrical member, which serves as an ink receiving member, of the liquid jet head by embedding the peripheral part of the filter expansively projected toward the liquid absorbing member filled in the tank in the foremost end of the cylindrical member, there do not arise malfunctions that when the tank is assembled/disassembled with/from the liquid jet head, the easy handling in assembling/disassembling the tank with/from the liquid jet head is obstructed, the filter is disconnected from the cylindrical member due to entanglement of the peripheral part of the filter with the liquid absorbing member, and moreover, the liquid supplying function of the tank is degraded due to inward expansion of the molten part of the cylindrical member inside of the inner wall surface of the latter arising when the filter is thermally secured to the cylindrical member.

A further aspect of Applicants' invention is a liquid jet head adapted to be detachably fitted into an opening portion of a liquid tank having a liquid absorbing member therein via a liquid receiving member having a liquid path formed therein. This liquid head has a filter, and the peripheral part of the filter is immovably embedded in the foremost end of the liquid receiving member such that the radially outermost end of the filter is not exposed, and said filter is maintained so as to have a dome-shaped contour adapted to come in pressure contact with the liquid absorbing member when the liquid jet head is fitted to the liquid tank by the immovable embedding of the peripheral part of the filter therein.

Yet another aspect of Applicants' invention pertains to a liquid jet apparatus with a liquid tank having a liquid absorbing member and having an opening portion formed thereon, and a liquid jet head adapted to be detachably fitted into the opening portion of the liquid tank via a liquid receiving member having a liquid path formed therein. The liquid jet head comprises a filter adapted to come in pressure contact with the liquid absorbing member when the liquid jet head is fitted to the liquid tank, and the peripheral part of the filter is immovably embedded in the foremost end of the liquid receiving member. Thus, the radially outermost end of the filter is not exposed, and the filter is maintained so as to have a dome-shaped contour by the immovable embedding of the peripheral part of the filter therein.

Still another aspect of this invention involves a method of immovably securing a filter to a liquid receiving member of a liquid jet head adapted to be detachably fitted into an opening portion of a liquid tank via the liquid receiving member having a liquid path formed therein. The liquid tank is filled with a liquid absorbing member. The method involves providing the liquid receiving member, this liquid receiving member being formed an annular flat shelf part and an annular projected part located outside of the flat annular shelf part at the foremost end thereof, placing a flat filter at least inside of the annular projected part, and heating and pressing the annular projected part of the liquid receiving member with the aid of a die having a recess, in which an inclined surface is formed at least at a position where the recess comes into contact with the annular projected part, and dimensioned to have a diameter larger than that of the annular projected part of the liquid receiving member. This way, the filter is deformed to be projected with a dome-shaped contour toward the recess and the peripheral part of the filter is immovably embedded to the foremost end of the liquid receiving member by fusing without exposing the radially outermost end thereof from the liquid receiving member.

The above and other objects, effects, features and advantages of the present invention will become more apparent from the following description of embodiments thereof taken in conjunction with the accompanying drawings.

BRIEF DESCRIPTION OF THE DRAWINGS

The present invention is illustrated in the following drawings in which.

DESCRIPTION OF THE PREFERRED EMBODIMENTS

The present invention will now be described in detail hereinafter with reference to the accompanying drawings which illustrate preferred embodiments thereof. It should be construed that the term "recorded" or "recording" appearing in this specification represents that an image is recorded or printed on a recording sheet, a cloth or the like.

First, the structure of a liquid jet recording apparatus (hereinafter referred to simply as a recording apparatus) to which the present invention is applicable will be described below with reference to FIG. 1.

Figure 1:
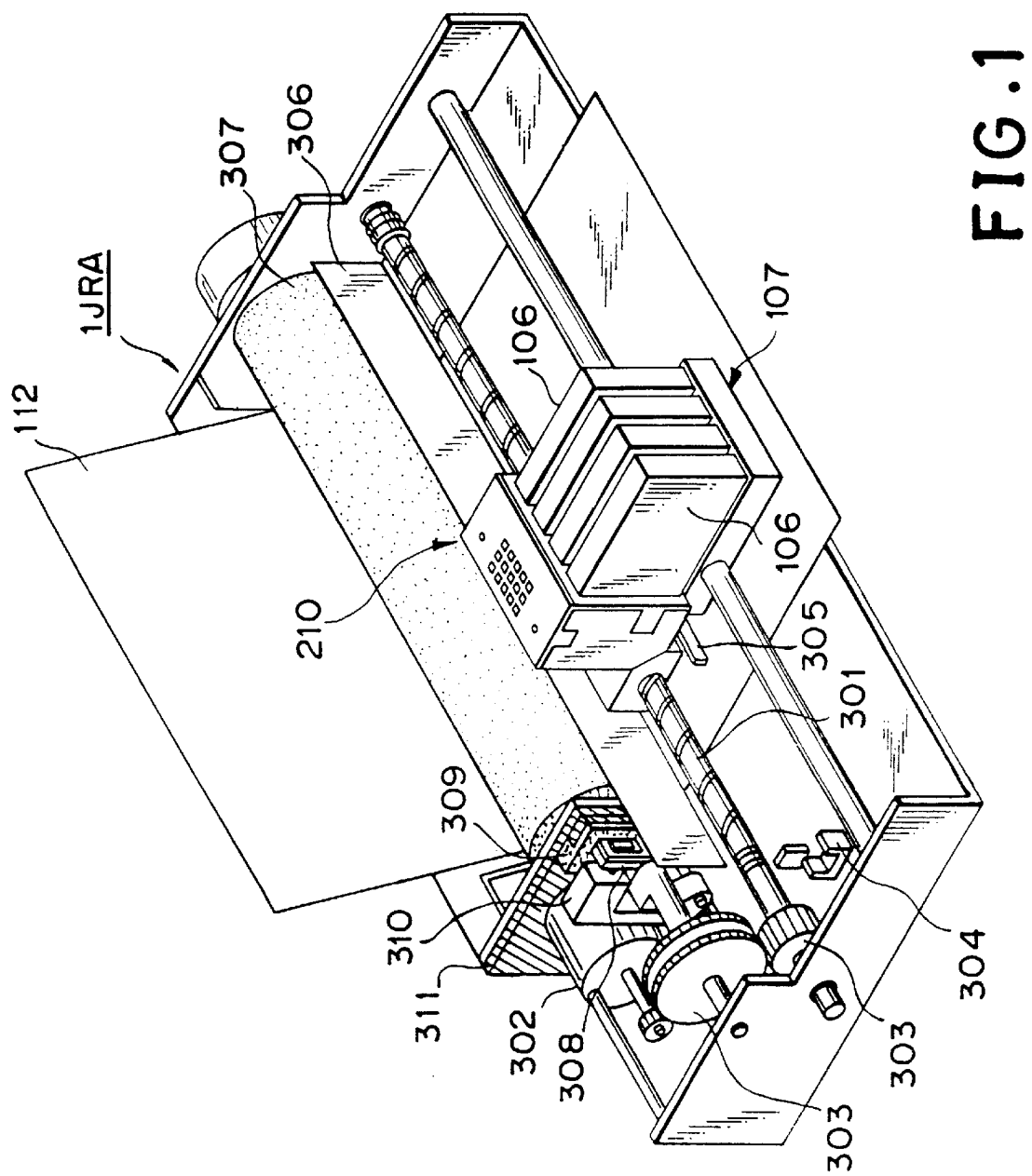
FIG. 1 is a perspective view of a liquid jet apparatus constructed according to the present invention, particularly showing essential components constituting the liquid jet apparatus.

In FIG. 1, reference numeral 301 designates a lead screw threadably engaged with part of a carriage 107 for displacing the latter along a recording sheet 112, reference numeral 302 designates a driving motor for rotating the lead screw 301, reference numeral 303 designates a pair of driving power transmission gears for transmitting the driving power of the driving motor 302 to the lead screw 301, reference numeral 304 designates a photo-coupler for detecting the presence of the carriage 107 when the latter is displaced in the vicinity of a home position thereof, and reference numeral 305 designates a lever projected from the carriage 107 for opening or shutting a light beam path for the photo-coupler 304. When the carriage 107 is displaced to the position optically associated with the photo-coupler 104, this is detected by the photo-coupler 104 so as to shift rotation of the driving motor 302 in the normal direction to rotation of the same in the reverse direction, and vice versa in order to displace the carriage 107 from the home position in the rightward direction.

On the other hand, a recording medium 112 such as a paper sheet, a plastic sheet, a cloth or the like is pressed against a platen 307 by a sheet retaining plate 306. The recording medium 112 is fed in the forward direction by actuating a sheet feeding mechanism (not shown) every time a recording operation is achieved by a head device 210 in conformity with the information derived from scanning. Reference numerals 308, 309, 310 and 311 designate a cap member, a cleaning blade, a pumping unit for recovering a liquid ejecting head, and a supporting member for supporting the cap member 308, the cleaning blade 309 and associated components, respectively.

Since a recording operation to be performed by the recording apparatus and a recovering operation to be performed for each liquid ejecting head are well known for any expert in the art, detailed description on these operations is herein neglected for the purpose of simplification. In this embodiment, since the respective liquid ejecting heads are held in the head device 210 while they are correctly registered relative to the head device 210 at a high accuracy, a high quality of recorded image is assured with the recording head. Additionally, each used ink jet head can easily be replaced by a new one, and moreover, when ink contained in each ink tank is consumed, the empty ink tank can easily be replaced by a new one.

Figure 2:
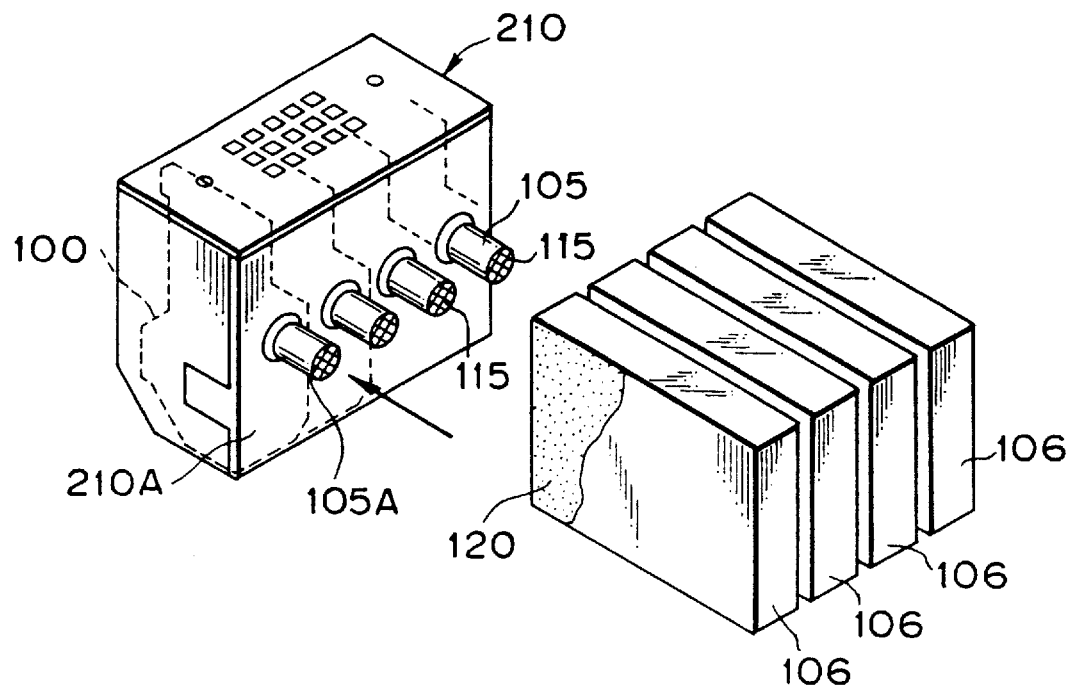
FIG. 2 is a perspective view of a head device and a plurality of ink tanks to be fitted to the corresponding recording heads received in the head device in the disassembled state.

FIG. 2 shows by way of perspective view a plurality of recording heads 100 each adapted to eject or discharge ink having a different color and a plurality of ink tanks 106 to be exchangeably fitted to the recording heads 100 in the disassembled state. The respective recording heads 100 are received in the head device 210 while they are correctly registered relative to the head device 210. In addition, a plurality of cylindrical members 105 each serving as an ink receiving member, having an ink supplying path 10SB formed therein and projected from the corresponding recording head 100 via a cover 210A of the head device 210 are arranged in the same direction in the equally spaced relationship. It should be noted that a filter 115 is disposed at the foremost end part 105A of each cylindrical member 105, and an ink supply port (not shown) is disposed in the form of an opening portion on each ink tank 106 filled with a porous member 120 as an ink absorbing member at the position corresponding to the foremost end part 105A of the cylindrical member 105.

With this construction, when ink contained in each ink tank 106 is consumed, only the empty ink tank 106 is replaced by a new one. When a new ink tank 106 is fitted to the foremost end part 105A of the cylindrical member 105 projected from the corresponding recording head 100 in the arrow-marked direction, a part of the porous member 120 filled in the ink tank 106 is compressed by the foremost end part 105A of the cylindrical member 105, causing ink to be introduced into the ink supplying path 105B via the filter 115 having a fine mesh size.

Next, a cylindrical member having a filter secured thereto according to the present invention will be described below.

Figure 3:
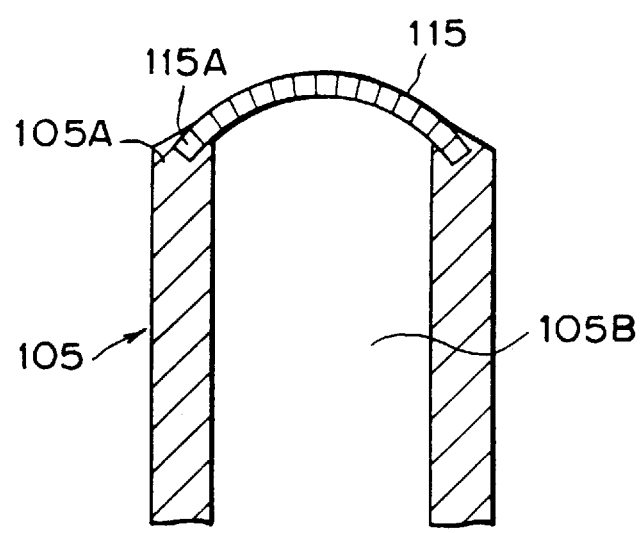
FIG. 3 is a fragmentary sectional view of a liquid jet head constructed according to the present invention, particularly showing the structure of an ink receiving member projected from the liquid jet head.

FIG. 3 shows by way of sectional view the structure of a cylindrical member which serves as an ink receiving member having a filter secured thereto according to the present invention. In this FIG. 3, reference numeral 10SB designates an ink supply path, and reference numeral 115 designates a filter made of, e.g., a metallic material and secured to the foremost end part 105A of the cylindrical member 105. In this embodiment, the filter 115 is designed in the semispherical contour and has a characterizing feature that a peripheral part 115A of the filter 115 is embedded in the foremost end part 105A of the cylindrical member 105. To this end, it is recommendable that the foremost end part 105A of the cylindrical member 105 molded of a synthetic resin is thermally softened, and thereafter, the peripheral part 115A of the filter 115 is embedded in the softened part of the cylindrical member 105 at the foremost end 105A of the latter.

With the cylindrical member 105 having the filter 115 secured thereto in the above-described manner, there does not arise a malfunction that the peripheral part 115A of the filter 115 is exposed to outside or a part of the softened synthetic resin constituting the cylindrical member 105 is inwardly expanded inside of the inner wall surface of the cylindrical member 105. Thus, there is no possibility that the filter 115 is disconnected from the cylindrical member 105 due to the entanglement of the peripheral part 115A of the filter 115 with the porous member 120 in the ink tank 106 when each empty ink tank 106 is replaced by a new one, and moreover, ink supplying is obstructed by the inwardly expanded part of the cylindrical member 105. Consequently, reliability of the recording head can be elevated because stable ink supplying is assured.

Although, in the above embodiment, the whole peripheral part 115A of the filter 115 is embedded in the cylindrical member 105 at the foremost end thereof, it may be possible that part of the peripheral of the filter 115 is not embedded provided that the same effect or function as that of the above embodiment is attainable.

Next, an apparatus and a method for securing a filter to a cylindrical member which serves as an ink receiving member according to the present invention will be described below with reference to FIGS. 4 and 5.

Figure 4:
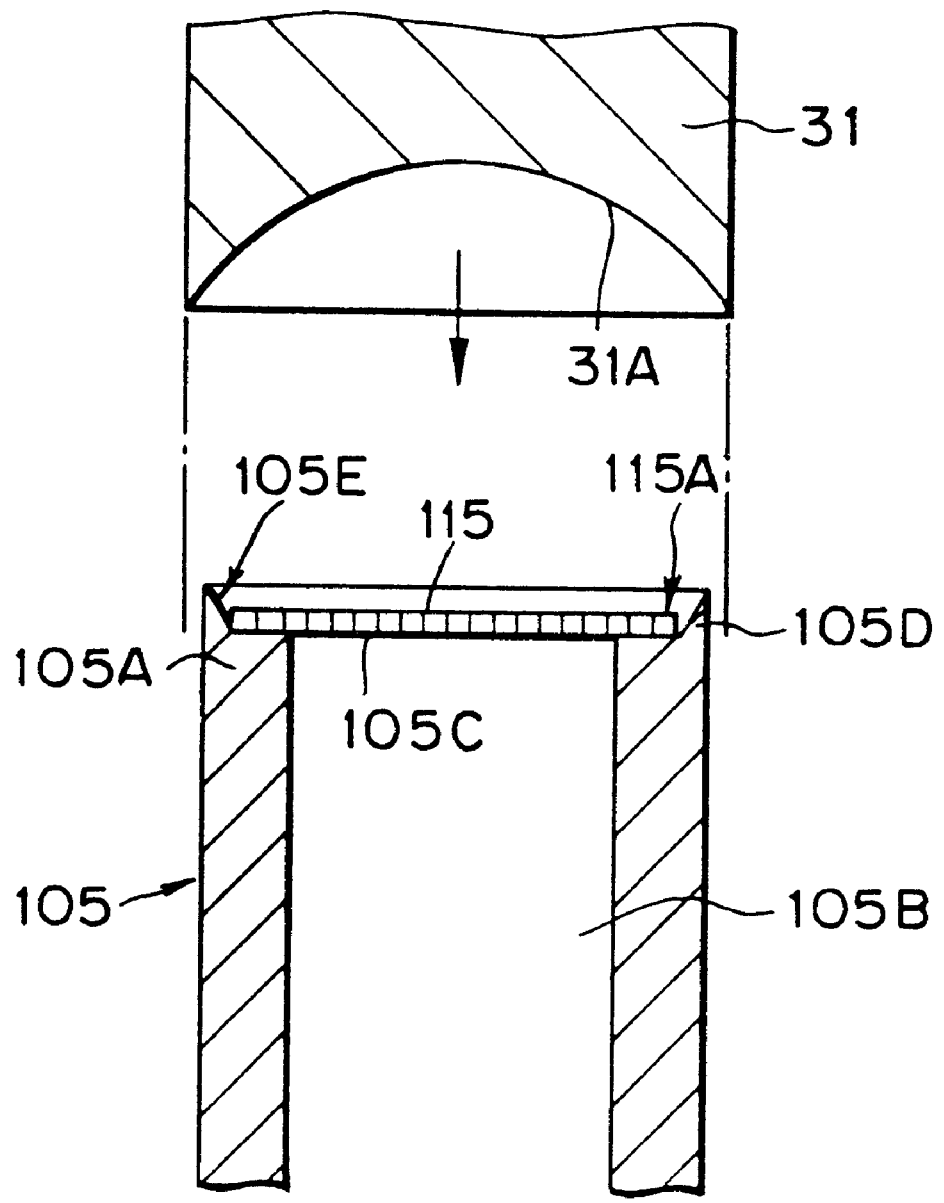
FIG. 4 is a fragmentary sectional view of the liquid jet head, particularly illustrating a method of immovably securing a filter to the foremost end of the ink receiving member according to the present invention.

In FIG. 4, reference numeral 31 designates a fusing die or a fusing head for melting a foremost end part 105A of a cylindrical member 105 for the purpose of thermally securing a filter 115 to the cylindrical member 105. A substantially semispherical concave guide surface 31A is formed at the lowermost end of the fusing head 31 so as to convexly spherically deform the filter 115. The outer periphery of the fusing die 31 is dimensioned to have a diameter appreciably larger than that of the cylindrical member 105. This makes it possible to allow the peripheral part of the filter 115 to be covered with an annular projected part 105D of the cylindrical member 105 when the latter is softened and molten. On the other hand, before the filter 115 is secured to the cylindrical member 105, an annular receiving part 105C (serving as an annular receiving shelf part) for enabling a flat filter 115 to be received thereon and an annular projected part 105D tapering from the annular receiving part 105C toward the peripheral edge of the cylindrical member 105 are formed on the uppermost end part 105A of the cylindrical member 105. Thus, an inclined surface 105E is formed inside of the annular projected part 105D while extending around the same. It is desirable that the annular projected part 105D is projected toward the fusing head 31 above the upper surface of the filter 115. This makes it easy to allow the peripheral edge of the filter 115 to be covered with the molten resin of the annular projected part 105D.

When the filter 115 is secured to the cylindrical member 105, first, a flat filter 115 is horizontally placed on the annular receiving portion or shelf 105C at the uppermost end 105A of the cylindrical member 105. At this time, it is desirable that care is taken such that the flat filter 115 is not erroneously slantwise placed on the inclined surface 105E. Otherwise, on completion of the filter securing operation, the filter 115 may be secured to the cylindrical member 105 with an inclined attitude. Subsequently, the fusing die 31 heated up to a predetermined temperature is lowered in the arrow-marked direction so as to allow the annular projected part 105D of the cylindrical member 105 to be squeezed with the fusing die 31 along the outer periphery of the annular projected portion 105D. As the squeezing operation proceeds, the annular projected part 105D is inwardly deformed by the concave spherical guide surface 31A of the fusing die 31, whereby a peripheral part 115A of the filter 115 is covered with the molten annular projected part 105D of the cylindrical member 105 as if it is enveloped in the same. As the fusing die 31 is lowered, the filter 115 is spherically deformed in conformity with the concave spherical contour of the guide surface 31A of the fusing die 31 because the cylindrical member 105 side of the filter 115 is supported by the annular receiving shelf 105C but the fusing head 31 side of the same is not supported by anything.

Figure 5:
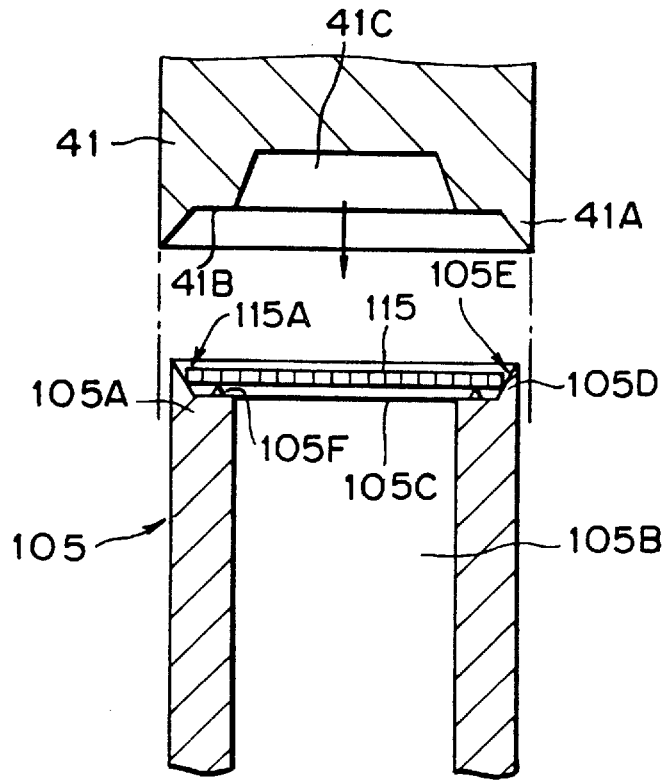
FIG. 5 is a fragmentary sectional view of the liquid jet head, particularly illustrating another method of immovably securing a filter to the foremost end of the ink receiving member according to the present invention.

FIG. 5 shows by way of sectional view the structure of another apparatus for securing a filter to a cylindrical member. In this embodiment, a fusing die 41 is dimensioned to have a diameter appreciably larger than that of a cylindrical member 105 and includes in turn a taper part 41A having a tapered surface, a flat stepped part 41B and a recess 41c for allowing a filter to deform. When the filter 115 is secured to a cylindrical member 105, first, a flat filter 115 is placed on an annular supporting part 105F raised above an annular receiving portion 105C, causing the flat filter 115 to be held in the slightly floated state.

At the time of performing a filter securing operation, while the foregoing floated state of the flat filter 115 is maintained, the fusing die 41 is lowered in the arrow-marked direction until the taper part 41A of the fusing die 41 comes in contact with the annular projected part 105D of the cylindrical member 105 so as to allow the latter to be squeezed with the taper part 41A. As the fusing die 41 is lowered further, the annular projected part 105D is inwardly deformed by the tapered surface of the taper part 41A but a part of the filter 115 corresponding to the annular supporting part 105F of the cylindrical member 105 is depressed by the flat stepped part 41B of the fusing die 41, causing the central part of the filter 115 to be spherically or dome-shapedly expanded in the recess 41C of the fusing die 41. Since the fusing die 41 is preliminarily heated up to a predetermined temperature, the annular projected part 105D is molten so that the peripheral part of the filter 115 is firmly covered with the molten resin of the annular projected part 105D as if it is enveloped in the latter. In this embodiment, since the annular supporting part 105F is simultaneously molten together with the annular projected part 105D of the cylindrical member 105 during the squeezing operation of the fusing die 41, it is ensured that ink leakage between the filter 115 and the cylindrical member 105 is prevented.

Figure 6:
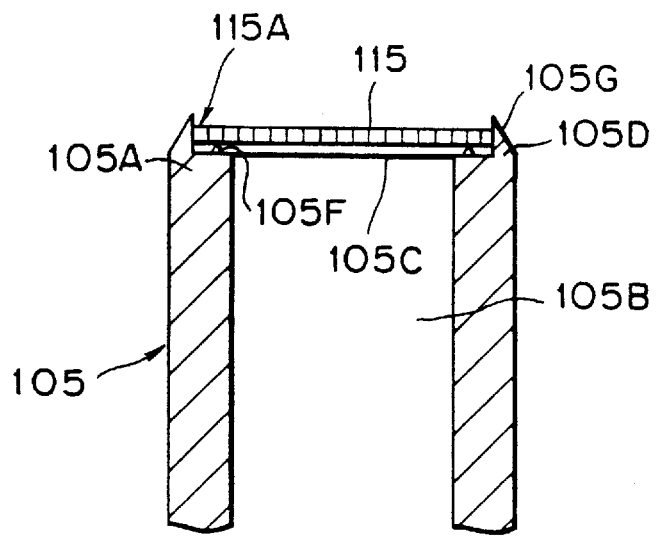
FIG. 6 is a fragmentary sectional view of the liquid jet head, particularly illustrating still another method of immovably securing a filter to the foremost end of the ink receiving member according to the present invention.
Figure 7:
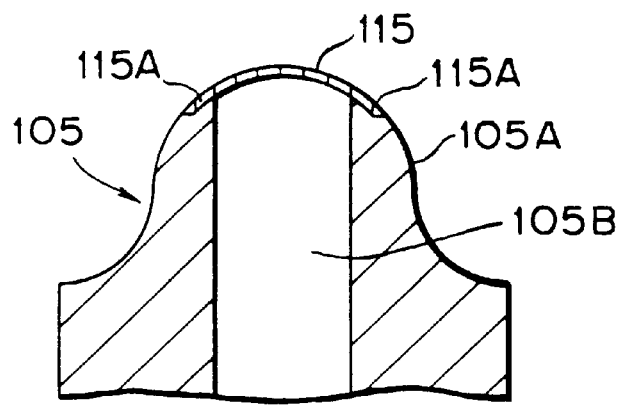
FIGS. 7 and 8 are fragmentary sectional views of a conventional liquid jet head, particularly showing by way of example the structure for securing a filter to an ink receiving member of the liquid jet head, respectively.
Figure 8:
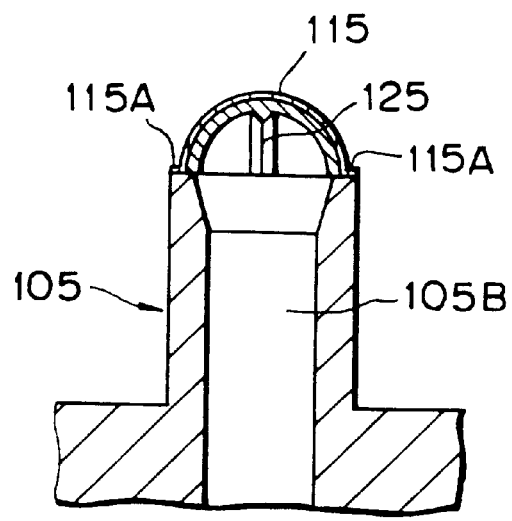

Next, FIG. 6 shows by way of sectional view a structure for securing a filter to a cylindrical member according to the present invention.

This embodiment is different from that in each of the preceding embodiments described above with reference to FIGS. 4 and 5 in respect of the structure of a cylindrical member 105 and the contour of an annular projected part 105D at the uppermost end 105A of the tubular member 105. In contrast with the preceding embodiments wherein the inclined surface 105E is formed inside of the annular projected part 105D, in this embodiment, an inclined surface 105G is formed outside of an annular projected part 105D. When the contour of the annular projected part 105D proposed in this embodiment is employed, the inner wall surface 31A, 41A of the fusing head 31, 41 can effectively be brought in contact with the outer inclined surface 105G of the annular projected part 105D. Thus, the annular projected part 105D of the cylindrical member 105 is easily softened and molten, resulting in the filter 115 being reliably thermally secured to the cylindrical member 105.

While the present invention has been described above with respect to a recording head constructed according to each of preferred embodiments thereof wherein at least a part of the peripheral part 115A of the filter 115, preferably the whole peripheral part of the same is thermally fused to the foremost end part 105A of the cylindrical member 105A, it should of course be understood that the present invention should not be limited only to the case that a plurality of recording heads are integrally received in the head device 210 as shown in FIGS. 1 and 2. Alternatively, the present invention may equally be applied to the case that a head device is composed of a single recording head and an ink tank to be fitted to the recording head.

In the aforementioned embodiments, any type of material is employable as a raw material for the cylindrical member 105, provided that it is proven that it is molten when the heated fusing die comes in contact with the material, and moreover, it has no adverse effect on ink to be ejected from the recording head. In addition, immovable securing of the filter 115 to the cylindrical member 105 should not be limited to a heating process. Alternatively, a supersonic welding process may be employed for the same purpose.

Moreover, in the above mentioned embodiments, the form of an ink receiving member is selected to be cylindrical in considering sure and easy connectivity with a tank and also capability of supplying ink. However, it should be understood that the form of an ink receiving member may be any other from as long as the sure and easy connectivity and the capability of supplying ink would be satisfied.

Additionally, the present invention should not be limited only to the recording apparatus constructed in the form of a serial printer. Alternatively, the present invention may equally be applied to a line type printer wherein each recording operation is performed by activating a line type liquid eject recording head corresponding to the whole width of a recording sheet or a part of the same, a color printer, and a recording apparatus including a plurality of recording heads each ejecting ink having a single color or ink having a different concentration with the same advantageous effects as those of the serial printer.

It should be added that the present invention achieves distinct effect when applied to a recording head or a recording apparatus which has means for generating thermal energy such as electrothermal transducers or laser, and which causes changes in ink by the thermal energy so as to eject ink. This is because such a system can achieve a high density and high resolution recording.

In addition, as far as an ink tank is detachably fitted to a recording head, the present invention is advantageously employable for a serial type recording apparatus also in the case that a recording head fixedly secured to a main body of the recording apparatus or an exchangeable tip type recording head capable of making electrical connection to the main body of the recording apparatus or feeding ink from the main body of the recording apparatus is used for the recording apparatus.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers and a means for carrying out preliminary ejection of ink independently of the ejection for recording. These systems are effective for reliable recordings.

Additionally, the ink jet recording apparatus of the present invention can be employed not only as an image output terminal of an information processing device such as a computer, but also as an output device of a copying machine including a reader, and as an output device of a facsimile unit having a transmission and receiving function.

Further, according to the present invention, the contour of a filter disposed on an ink supplying member of the liquid jet recording head should not be limited only to the semispherical shape as described above with reference to FIGS. 4 to 6. Alternatively, the projected part of the filter may exhibit a substantially spherical shape rather than the semispherical shape, a conical shape, a frusto-conical shape, domy shape or a revolving parabolic shape. The ink supplying path may be constructed such that it serves as a filter as a whole, a reinforcement member for preventing the filter from being collapsed is disposed in the filter, the ink supplying path is caused to extend while it is increasingly expanded in the longitudinal direction, the ink supplying path is tapered toward the foremost end thereof corresponding to the shape of the filter so as to be connected to the latter, or a reinforcement member is disposed along the inner wall surface of the filter.

The present invention has been described detail with respect to preferred embodiments, and it will now be that changes and modifications may be made without departing from the invention in its broader aspects, and it is the intention, therefore, in the appended claims to cover all such changes and modifications as fall within the true spirit of the invention.

What is claimed is:

1. A liquid jet head detachably fitted to a liquid tank having a liquid absorbing member therein, said liquid jet head comprising;
   a liquid receiving member having a liquid path formed therein and a foremost end, the liquid jet head being fitted to the liquid tank via the liquid receiving member;
   a filter having an outer surface which is detachably fittable to the liquid absorbing member, and
   wherein the peripheral edge of said filter on the side which comes into contact with said liquid absorbing member is covered with the foremost end of said liquid receiving member.

2. A liquid jet head as claimed in claim 1, wherein said filter is configured in such a manner as to be projected toward said liquid absorbing member filled in said liquid tank.

3. A liquid jet head as claimed in claim 1, wherein said liquid receiving member is shaped in such a manner as to be cylindrical and said filter is immovably embedded at the foremost end of said cylindrical liquid receiving member.

4. A liquid jet head as claimed in claim 1, wherein the peripheral part of said filter is dimensioned to have a diameter smaller than an outer diameter of said liquid receiving member.

5. A liquid jet head as claimed in claim 1, wherein the peripheral part of said filter is thermally fused to the foremost end of said liquid receiving member.

6. A liquid jet head as claimed in claim 5, wherein said filter is made of a metallic material.

7. A liquid jet head as claimed in claim 1, wherein said liquid jet head comprises a common liquid chamber communicated with said liquid path of said liquid receiving member, a plurality of discharging orifices, a plurality of second liquid paths by way of which each of said discharging orifices is communicated with said common liquid chamber, and a plurality of electrothermal converting elements disposed in said second liquid paths so as to generate thermal energy for ejecting liquid from said discharging orifices.

8. The liquid jet head as claimed in claim 7, wherein each of said electrothermal converting elements serves to produce film boiling of said liquid.

9. A liquid jet head as claimed in claim 7, wherein said liquid is ink.

10. A liquid jet apparatus, comprising:
    a liquid tank having a liquid absorbing members
    a liquid receiving member having a liquid path formed therein and a foremost end; and
    a liquid jet head detachably fitted to said liquid tank via said liquid receiving member, said liquid jet head comprising a filter having an outer surface which is detachably fittable to said liquid absorbing member when said liquid jet head is fitted to said liquid tank,
    wherein a peripheral edge of said filter on the side which comes into contact with said liquid absorbing member is covered with the foremost end of said liquid receiving member.

11. A liquid jet apparatus as claimed in claim 10, wherein said filter is configured in such a manner as to be projected toward said liquid absorbing member filled in said liquid tank.

12. A liquid jet apparatus as claimed in claim 10, wherein said liquid receiving member is shaped in such a manner as to be cylindrical and said filter is immovably embedded at the foremost end of said cylindrical liquid supply member.

13. A liquid jet apparatus as claimed in claim 10, wherein said liquid jet head comprises a common liquid chamber communicated with said liquid path of said liquid receiving member, a plurality of discharging orifices, a plurality of second liquid paths by way of which each of said discharging orifices is communicated with said common liquid chamber, and a plurality of electrothermal converting elements disposed in said second liquid paths so as to generate thermal energy for ejecting liquid from said discharging orifices.

14. A liquid jet apparatus as claimed in claim 13, wherein each of said electrothermal converting elements serves to produce film boiling of said liquid.

15. A method of immovably securing a filter to a liquid receiving member of a liquid jet head detachably fitted into an opening portion of a liquid tank via said liquid receiving member having a liquid path formed therein and a foremost end, said liquid tank being filled with a liquid absorbing member, comprising;

a step of providing said liquid receiving member, said liquid receiving member being formed with an annular flat shelf part and an annular projected part located outside of said flat annular shelf part at the foremost end thereof, a step of placing a flat filter having an outer surface which is detachably fittable to said liquid absorbing member at least inside of said annular projected part, and a step of heating and pressing said annular projected part of said liquid receiving member with the aid of a die having a recess, in which an inclined surface is formed at least at a position where said recess comes into contact with said annular projected part, and dimensioned to have a diameter larger than that of said annular projected part of said liquid receiving member, whereby said filter being deformed to be projected toward said recess and the peripheral edge of said filter on the side which comes into contact with said liquid absorbing member is covered with the foremost end of said liquid receiving member by fusing without exposing the radially outermost end thereof from said liquid receiving member.

16. A method as claimed in claim 15, wherein said annular projected part is tapered from said annular flat shelf part toward the peripheral edge of said liquid receiving member.

17. A method as claimed in claim 16, wherein said filter is placed on said annular flat shelf part.

18. A method as claimed in claim 15 further comprising a step of forming an annular supporting part above said annular flat shelf part at the foremost end of said cylindrical member so as to allow said filter to be placed on said annular supporting part.

19. A method as claimed in claim 15, wherein the outer peripheral surface of said annular projected part is inwardly inclined while tapering toward the foremost end thereof.

20. A method as claimed in claim 19 further comprising a step of forming an annular supporting part above said flat annular shelf part at the foremost end of said cylindrical member so as to allow said filter to be placed on said annular supporting part.

21. A liquid jet head detachable from a liquid tank having a liquid absorbing member therein, said liquid head comprising;

a liquid receiving member having a liquid path formed therein with an inlet at an end of said liquid path; and a filter having an outer surface which is detachably fittable to the liquid absorbing member, wherein a groove is provided at an inside of said inlet and a peripheral part of said filter including said outer surface is embedded in said groove.

* * * * *

UNITED STATES PATENT AND TRADEMARK OFFICE
CERTIFICATE OF CORRECTION

PATENT NO. : 5,900,898

DATED : May 4, 1999

INVENTOR(S): EIICHIRO SIMIZU, ET AL.

Page 1 of 4

It is certified that error appears in the above-identified patent and that said Letters Patent is hereby corrected as shown below:

Title page,

AT [56] REFERENCES CITED

FOREIGN PATENT DOCUMENTS

Page 2, "360262653" should read --60-262653--.

AT [57] ABSTRACT

Line 9, "in" should read --into--.

COLUMN 1

Line 36, "therefore." should read --therefor.--; and
Line 39, "therefore" should read --therefor--.

COLUMN 2

Line 9, "few" should read --little--; and
Line 24, "spattering" should read --sputtering--.

COLUMN 3

Line 21, "following" should read --the following--; and
Line 57, "therefore." should read --therefor.--.

UNITED STATES PATENT AND TRADEMARK OFFICE
CERTIFICATE OF CORRECTION

PATENT NO. : 5,900,898

DATED : May 4, 1999

INVENTOR(S): EIICHIRO SIMIZU, ET AL.

It is certified that error appears in the above-identified patent and that said Letters Patent is hereby corrected as shown below:

COLUMN 4

Line 67, "formed" should read --formed with--.

COLUMN 5

Line 52, "in" should read --into--; and
Line 62, "in" should read --into--.

COLUMN 7

Line 22, "photo-coupler 104," should read --photo-coupler 304,--;
Line 23, "photo-coupler 104" should read --photo-coupler 304--;
Line 42, "for" (second occurrence) should read --to--; and
Line 62, "path 10SB" should read --path 105B--.

COLUMN 8

Line 21, "numeral 10SB" should read --numeral 105B--; and
Line 53, "peripheral" should read --periphery--.

UNITED STATES PATENT AND TRADEMARK OFFICE
CERTIFICATE OF CORRECTION

PATENT NO. : 5,900,898

DATED : May 4, 1999

INVENTOR(S): EIICHIRO SIMIZU, ET AL.

It is certified that error appears in the above-identified patent and that said Letters Patent is hereby corrected as shown below:

COLUMN 9

Line 50, "41c" should read --41C--.

COLUMN 10

Line 38, "member 105A," should read --member 105,--; and
Line 60, "from" should read --form--.

COLUMN 11

Line 49, "domy" should read --dome--;
Line 61, "detail" should read --in detail--; and
Line 62, "now be" should read --be understood--.

COLUMN 12

Line 4, "comprising;" should read --comprising:--; and
Line 47, "members" should read --member;--.

UNITED STATES PATENT AND TRADEMARK OFFICE
CERTIFICATE OF CORRECTION

PATENT NO. : 5,900,898

DATED : May 4, 1999

INVENTOR(S): EIICHIRO SIMIZU, ET AL.

Page 4 of 4

It is certified that error appears in the above-identified patent and that said Letters Patent is hereby corrected as shown below:

COLUMN 14

Line 27, "prising;" should read --prising:--.

Signed and Sealed this

Twenty-fifth Day of April, 2000

Attest:

Q. TODD DICKINSON

*Attesting Officer*   *Director of Patents and Trademarks*